US009718534B2

(12) United States Patent
Pascual Fuertes et al.

(10) Patent No.: US 9,718,534 B2
(45) Date of Patent: Aug. 1, 2017

(54) AIRCRAFT LIFTING SURFACE WITH VARIABLE SWEEP DISTRIBUTION ALONG THE SPAN

(71) Applicant: Airbus Operations S. L., Getafe Madrid (ES)

(72) Inventors: Angel Pascual Fuertes, Getafe Madrid (ES); Sergio Rodriguez Sanchez, Getafe Madrid (ES)

(73) Assignee: Airbus Operations S.L., Getafe (ES)

( * ) Notice: Subject to any disclaimer, the term of this patent is extended or adjusted under 35 U.S.C. 154(b) by 149 days.

(21) Appl. No.: 13/942,880

(22) Filed: Jul. 16, 2013

(65) Prior Publication Data

US 2014/0131511 A1    May 15, 2014

(30) Foreign Application Priority Data

Jul. 16, 2012    (EP) .................................... 12382282

(51) Int. Cl.
| B64C 3/38 | (2006.01) |
| B64C 3/40 | (2006.01) |
| B64C 5/02 | (2006.01) |
| B64C 5/04 | (2006.01) |
| B64C 39/12 | (2006.01) |
| B64C 3/10 | (2006.01) |

(52) U.S. Cl.
CPC ................. *B64C 3/40* (2013.01); *B64C 3/10* (2013.01); *B64C 5/02* (2013.01); *B64C 5/04* (2013.01); *B64C 39/12* (2013.01)

(58) Field of Classification Search
CPC .... B64C 1/26; B64C 3/40; B64C 3/10; B64C 3/16; B64C 3/14; B64C 5/04; B64C 5/14; B64C 2003/10; B64C 2003/14; B64C 2003/146
See application file for complete search history.

(56) References Cited

U.S. PATENT DOCUMENTS

| 1,336,405 | A | * | 4/1920 | Henry Kleckler .............. 244/87 |
| 2,439,304 | A | | 4/1948 | Jackson |
| 4,139,172 | A | * | 2/1979 | Miller et al. ................ 244/45 R |
| 4,641,800 | A | * | 2/1987 | Rutan ....................... B64C 3/54 |
| | | | | 244/218 |
| 6,676,077 | B1 | | 1/2004 | DiChiara, Jr. et al. |
| 6,857,598 | B2 | * | 2/2005 | Adamson .............. B64C 1/0009 |
| | | | | 244/119 |

(Continued)

FOREIGN PATENT DOCUMENTS

| DE | 19857644 | 6/2000 |
| EP | 2368793 | 9/2011 |
| GB | 2025341 | 1/1980 |

OTHER PUBLICATIONS

European Search Report, Nov. 19, 2012.

*Primary Examiner* — Philip J Bonzell
(74) *Attorney, Agent, or Firm* — Greer, Burns & Crain, Ltd.

(57) ABSTRACT

An aircraft lifting surface attached to the rear or frontal end of the aircraft fuselage with a variable sweep angle α in an inboard part and with a constant sweep angle α1 in an outboard part. The aircraft lifting surface can be for example a horizontal tail plane or a vertical tail plane attached to the rear end fuselage or a canard attached to the frontal end fuselage.

7 Claims, 4 Drawing Sheets

(56) References Cited

U.S. PATENT DOCUMENTS

| | | | | |
|---|---|---|---|---|
| 7,900,868 B2* | 3/2011 | Sankrithi | ............... | B64C 3/10 244/1 N |
| 8,317,128 B2* | 11/2012 | Tracy | ............... | B64C 3/10 244/35 R |
| 2010/0148000 A1* | 6/2010 | Llamas Sandin | ......... | B64C 5/02 244/87 |
| 2012/0043430 A1* | 2/2012 | Tracy | ............... | B64C 3/10 244/35 R |
| 2012/0205490 A1* | 8/2012 | Whitehouse et al. | .......... | 244/89 |

* cited by examiner

AIRCRAFT LIFTING SURFACE WITH VARIABLE SWEEP DISTRIBUTION ALONG THE SPAN

CROSS-REFERENCES TO RELATED APPLICATIONS

This application claims the benefit of the European patent application No. 12382282.7 filed on Jul. 16, 2012, the entire disclosures of which are incorporated herein by way of reference.

FIELD OF THE INVENTION

The present invention relates to aircraft lifting surfaces and more in particular to aircraft with a lifting surface attached to an end of the fuselage such as a horizontal tail plane, a vertical tail plane or a canard.

BACKGROUND OF THE INVENTION

The performance of the horizontal tail plane (HTP), the vertical tail plane (VTP) and other lifting surfaces attached to the ends of aircraft fuselages is one of the more important issues in global aircraft design because said surfaces are used as control and stabilizing surfaces that must provide control and stabilizing forces in the complete flight domain.

The aim of a good aerodynamic design for a lifting surface is to control the interferences with the fuselage which are sources of aerodynamic drag and loss of lift. In this respect, the sweep angle of a lifting surface is a key feature of its design.

Aircraft configurations with forward swept and backward swept horizontal tail planes at different sweep angles are known in the art. In relation to commercial aircraft configured with a tubular fuselage, a wing, an empennage with HTP and VTP, such as the A320 or the A380, all known configurations include HTP/VTP with a constant sweep angle distribution along the span.

In these configurations and due to the interference with the fuselage, the inner sections of the HTP/VTP are not working at the same flow conditions than the outer sections, providing room for further optimization. This effect is more pronounced the greater the change in the area of the cross section of the rear fuselage along the zone to which the HTP/VTP is attached.

SUMMARY OF THE INVENTION

It is an object of the present invention to provide a lifting surface attached to an end of the fuselage of an aircraft optimized in size.

It is another object of the present invention to provide a lifting surface attached to an end of the fuselage of an aircraft having an improved lift curve slope with respect to known lifting surfaces.

These and other objects are met by a lifting surface attached to the frontal end or to the rear end (that have a variable cross-sectional area) of a tubular-shaped fuselage of an aircraft which is configured with a variable sweep angle $\alpha$ in an inboard part and with a constant sweep angle $\alpha 1$ in an outboard part.

The lifting surface can be either a backward-swept lifting surface, as happens in the majority of commercial aircraft, or a forward-swept lifting surface.

In an embodiment for a lifting surface attached to the fuselage rear end (such as a HTP or a VTP), the sweep angle $\alpha$ in the inboard part (which is variable along its span) is lower than the constant sweep angle $\alpha 1$ in the outboard part. The local Mach number distribution along the span of the lifting surface due to the interference with the fuselage (lower Mach numbers in the inboard part than in the outboard part) allows a reduction of the sweep angle in the inboard part that increases the lift curve slope of the lifting surface.

Advantageously, the variable sweep angle $\alpha$ in the inboard part of the lifting surface increases along its span. A progressive increment of the sweep angle $\alpha$ in the inboard part up to the constant value $\alpha 1$ in the outboard part provides an optimized design of the lifting surface.

Advantageously, the lifting surface comprises a leading edge, a torsion box and a trailing edge and the torsion box comprises straight frontal and rear spars. The variable sweep angle in the inboard part is thus compatible with a torsion box comprising straight spars.

In an embodiment for a lifting surface attached to the fuselage frontal end (such as a canard) the sweep angle $\alpha$ in the inboard part (which is variable along its span) is greater than the constant sweep angle $\alpha 1$ in the outboard part. The increase of the sweep angle in the inboard part decreases the lift curve slope but allows delaying the adverse effects of compressibility and decreasing the sweep angle of the outboard part.

Advantageously the sweep angle in the inboard part of the lifting surface attached to the frontal end decreases along its span. A progressive decrement of the sweep angle $\alpha$ in the inboard part up to the constant value $\alpha 1$ in the outboard part provides an optimized design of the lifting surface.

Other desirable features and advantages of the aircraft according to this invention will become apparent from the subsequent detailed description of the invention and the appended claims, in relation with the enclosed drawings.

DETAILED DESCRIPTION OF THE PREFERRED EMBODIMENTS

A detailed description of the invention for a backward swept HTP follows.

Figure 1:
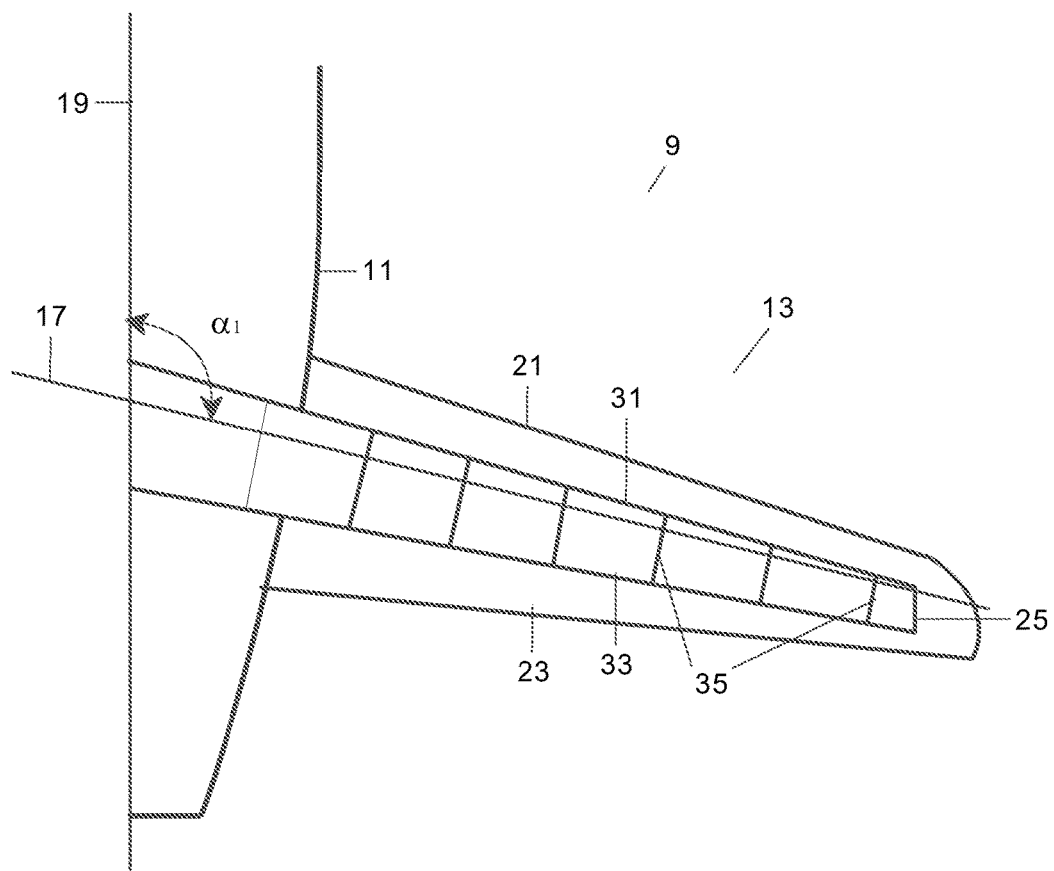
FIG. 1 is a schematic plan view of half of the fuselage rear end of a known aircraft with a backward-swept horizontal tail plane.

FIG. 1 illustrates a known aircraft 9 with a HTP 13 attached to the fuselage rear end 11.

The HTP 13 comprises a leading edge 21, a torsion box 25, and a trailing edge 23. The torsion box 25 comprise a frontal spar 31, a rear spar 33, ribs 35 and upper and lower skins stiffened by stringers (not shown). The upper and lower skins are joined to the leading edge 21 and to the trailing edge 23 forming the aerodynamic contour of the HTP 13.

The HTP 13 is configured with a constant backward sweep angle α1, i.e. with a constant sweep angle α1 greater than 90°. The sweep angle is the angle formed between the aircraft plane of symmetry 19 and the projection line 17 of a reference line of points located at 25% of the local chord of the HTP 13 on a plane perpendicular to the aircraft plane of symmetry 19.

The sweep angle of aircraft airfoils is a design feature of aircraft that fly at speeds approaching the speed of sound, and it is motivated by aerodynamic considerations. The aerodynamic advantage of a backward sweep angle is that the adverse effects of compressibility, caused by the over speed of the flow over the aerodynamic profile, which grow as the relative thickness of that profile increases, are mainly dependent on the component of the airflow velocity that is essentially perpendicular to the line of 25% of the chord line of the aircraft airfoil. This velocity component decreases as the sweep angle increases (in absolute value, either positively for backward sweep or negatively for forward sweep).

Therefore, for a given flight speed, an airfoil with a given sweep angle will be subjected to lower compressibility effects. This effect allows the use of a bigger relative profile thickness, defined as the ratio between the maximum thickness of the profile and its length in the flight or chord direction, resulting in a lower structural weight of the airfoil because of a better structural efficiency. However, in the flight at high speed that is characteristic of large modern commercial aircraft, airfoils with large relative thicknesses of the aerodynamic profiles magnify the adverse effects of air compressibility, which can be manifested as shock waves on the airfoil, with an associated increase of the aerodynamic drag, loss of control capability and other adverse flight phenomena. Therefore, the backward or forward sweep angle of airfoils serves to achieve a design balance between their structural weight and acceptable in-flight performance at speeds approaching the speed of sound.

Figure 2:
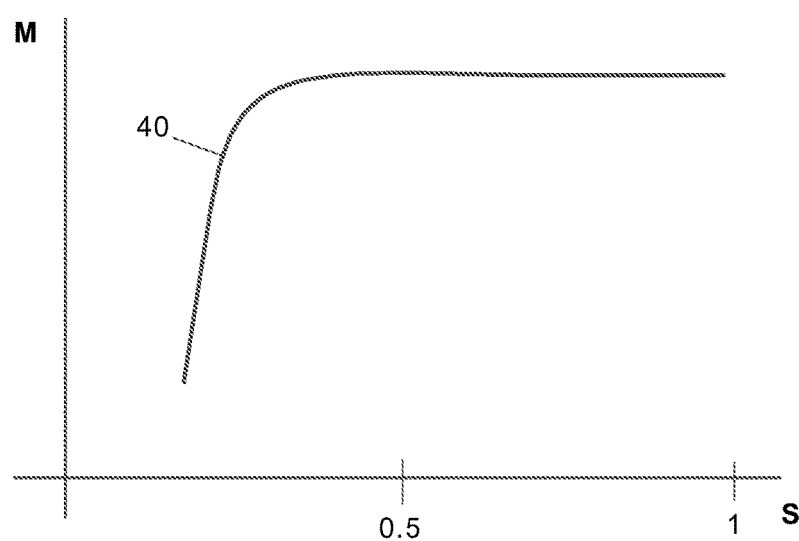
FIG. 2 is a Mach number vs. Span diagram for the horizontal tail plane of FIG. 1.

However, analysing the performance of the known backward-swept HTP 13 it has been noted that in some cases the distribution of the Mach number M along the span S follows the curve 40 shown in FIG. 2. The inboard sections of the HTP 13 are thus working at lower Mach numbers than the rest of the sections; therefore those sections do not need the sweep angle values of the outboard sections as the compressibility effects are naturally delayed by the interaction with the fuselage recompression. As a side effect this causes the lift curve slope of the HTP 13 to be reduced with respect to the one that hypothetically would be obtained if the local Mach number were constant across the span and equal to the flight Mach number.

It is believed that this behaviour is due to the interference of the airflow with the rear end fuselage 11 because of its curved shape (in a plan view) and the recompression which occurs as the flow approach to the fuselage end. The effect is more pronounced the greater the change in the area of the cross section along the zone of the rear fuselage to which the HTP is attached.

The opposite behaviour can be found in lifting surfaces attached at the frontal end of the fuselage as the flow expands from the forward stagnation point onwards. However it usually does not happen in a wing because it is attached to a cylindrical-shaped fuselage where no expansion or recompression occurs due to the fuselage shape. Of course the cylindrical fuselage affects the flow on the wing but the effect is usually more related to the change of the flow direction than to the change of the local Mach number which typically occurs at the rear and at the forward end of the fuselage.

Figure 3:
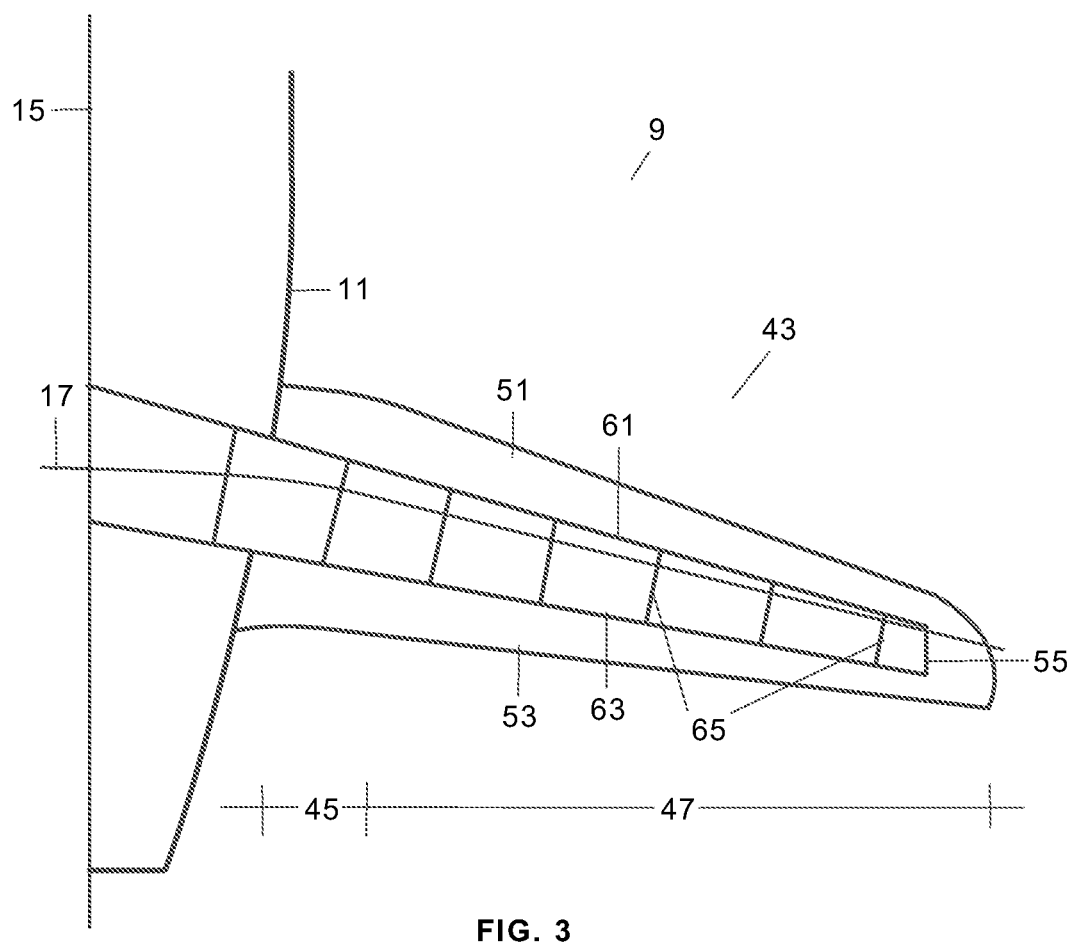
FIG. 3 is a schematic plan view of half of the fuselage rear end of an aircraft with a backward-swept horizontal tail plane according to the present invention.

FIG. 3 illustrates an aircraft 9 with an HTP 43 attached to the fuselage rear end 11 configured according to this invention.

The HTP 43 comprises a leading edge 51, a torsion box 55, and a trailing edge 53.

Figure 4:
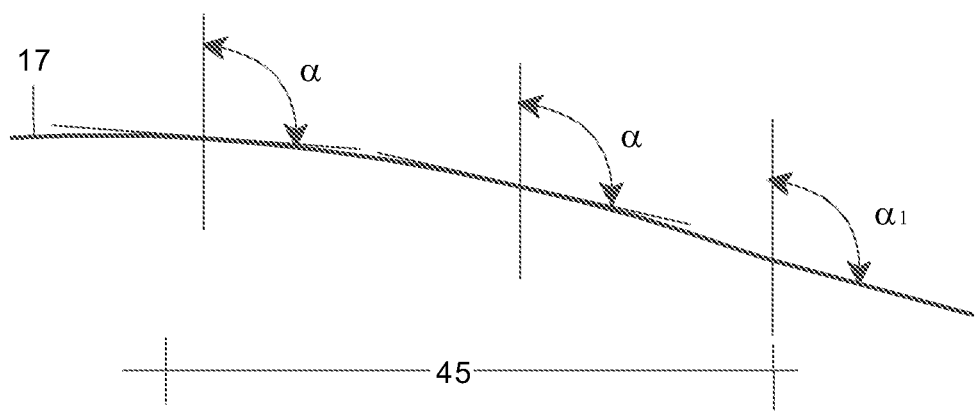
FIG. 4 is an enlarged view of the projection on a horizontal plane of a line at the 25% of the chord in the inboard part of the horizontal tail plane according to the present invention.

The HTP 43 is configured with an inboard section 45 having an increasing sweep angle α along the span and an outboard section 47 having a constant sweep angle α1, the constant angle α1 being greater than any value of the sweep angle α in the inboard section 45 (see FIG. 4).

The reduced sweep angles in the inboard section 45 with respect to the sweep angle of the outboard section 47 increases the lift curve slope of the HTP 43 with respect to the HTP 13 of the prior art, consequently allowing a size reduction in case the size of the HTP 13 would be a relevant design variable.

In the embodiment shown in FIG. 3, the torsion box 55, comprising a frontal spar 61, a rear spar 63, ribs 65 and upper and lower skins stiffened by stringers (not shown), has the same configuration as the torsion box 23 of the HTP 13 of the prior art because the variation of the sweep angle in the inboard section 45 with respect to the HTP 13 does not require a modification in the configuration of the torsion box. In other embodiments the torsion box 55 may have a different configuration.

The above description of the invention for a backward/forward swept HTP is also applicable mutatis mutandi to a forward HTP (shown in FIG. 5, below) and also to a backward/forward sweep VTP.

Figure 5:
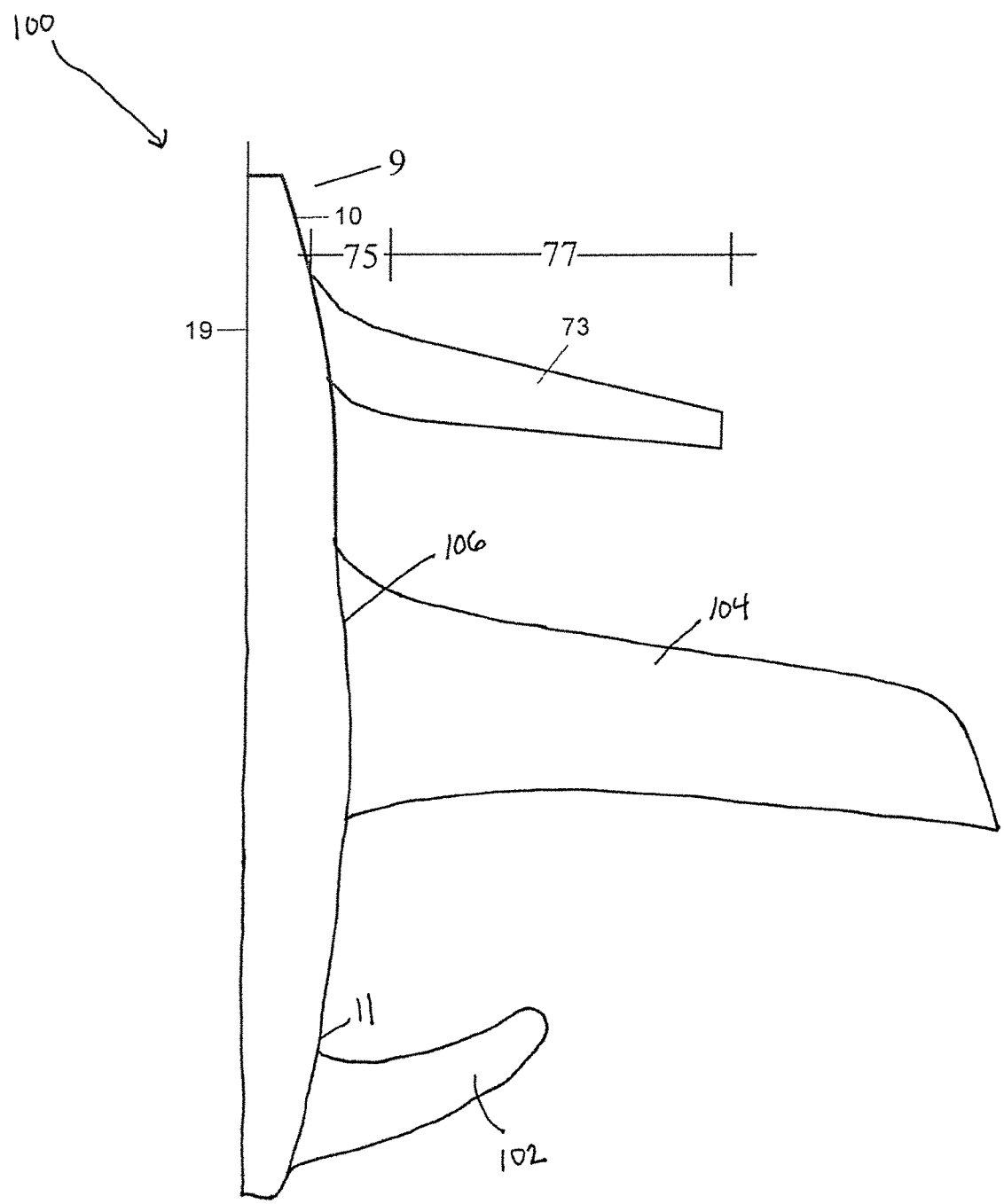
FIG. 5 a schematic plan view of half of the fuselage frontal end of an aircraft with a backward-swept canard.
Figure 6:
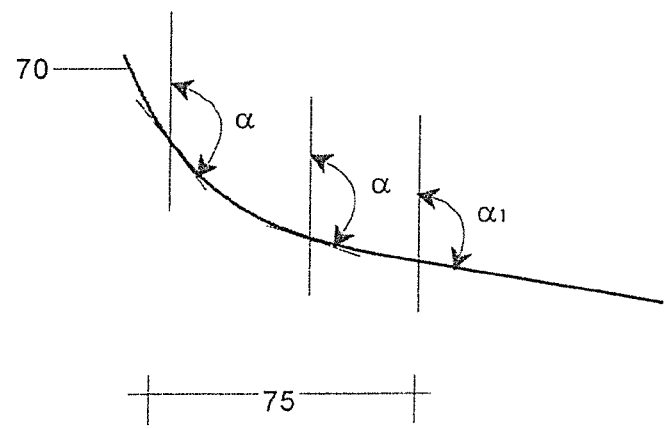
FIG. 6 is an enlarged view of the projection on a horizontal plane of a line at the 25% of the chord in the inboard part of a canard according to the present invention.

FIGS. 5 and 6 show an airplane 100 with a backward swept canard 73 attached to a fuselage frontal end 10 whose cross-sectional area increases continuously along its length to a fuselage rear end 11 having an HTP 102 with a forward sweep. A wing 104 is attached to a fuselage central part 106.

The canard 73 is configured with an inboard section 75 having a decreasing sweep angle α along the span and an outboard section 77 having a constant sweep angle α1, the constant angle α1 being lower than any value of the sweep angle α in the inboard section 75.

The sweep angle is the angle formed between the aircraft plane of symmetry 19 and the projection line 70 of a reference line of points located at 25% of the local chord of the canard 73 on a plane perpendicular to the aircraft plane of symmetry 19.

The increment of the sweep angle in the inboard section 75 with respect to the sweep angle of the outboard section 77 allows delaying the compressibility effects, magnified by the local expansion of the nose fuselage. The lift curve slope of the canard 73 can be increased by reducing the sweep angle of the outboard sections from the values which are needed inboard, allowing the reduction of the size of the canard 73 if its size is a relevant design variable.

Although the present invention has been described in connection with various embodiments, it will be appreciated from the specification that various combinations of elements, variations or improvements therein may be made, and are within the scope of the invention.

The invention claimed is:

1. An aircraft comprising:
 a fuselage of a tubular shape with frontal and rear ends having a variable cross-sectional area,
 a wing attached to the central part of the fuselage and at least a lifting surface attached to one of the fuselage rear end and the fuselage frontal end, wherein said lifting surface is configured with a sweep angle formed between an aircraft plane of symmetry and a projection line formed by reference points located at 25% of a local chord length of the lifting surface on a plane perpendicular to the aircraft plane of symmetry, and wherein the sweep angle in an inboard part of the lifting surface comprises a variable sweep angle α and wherein the sweep angle in an outboard part of the lifting surface comprises a constant sweep angle α1, and wherein the lifting surface is attached to the fuselage rear end;

the variable sweep angle α in the inboard part of the lifting surface is lower along its span than the constant sweep angle α1 in the outboard part of the lifting surface.

2. The aircraft according to claim 1, wherein the cross-sectional area of the fuselage rear end decreases continuously along its length.

3. The aircraft according to claim 1, wherein the variable sweep angle α in the inboard part increases along its span.

4. The aircraft according to claim 1, wherein the length of the inboard part of the lifting surface comprises between 0-70% of a total length of the lifting surface.

5. The aircraft according to claim 1, wherein:
the lifting surface comprises a leading edge, a torsion box and a trailing edge;
the torsion box comprises straight frontal and rear spars.

6. The aircraft according to claim 1, wherein the lifting surface is one of a horizontal tail plane and a vertical tail plane, with one of a backward and forward sweep angle.

7. An aircraft comprising:
a fuselage of a tubular shape with frontal and rear ends having a variable cross-sectional area,
a wing attached to the central part of the fuselage and at least a lifting surface attached to one of the fuselage rear end and the fuselage frontal end, wherein the wing comprises a backward swept horizontal tail plane, and,
wherein said lifting surface is configured with a sweep angle formed between an aircraft plane of symmetry and a projection line formed by reference points located at 25% of a local chord length of the lifting surface on a plane perpendicular to the aircraft plane of symmetry, and wherein the sweep angle in an inboard part of the lifting surface comprises a variable sweep angle α and wherein the sweep angle in an outboard part of the lifting surface comprises a constant sweep angle α1.

* * * * *